United States Patent
Takarada et al.

(10) Patent No.: US 12,465,258 B2
(45) Date of Patent: Nov. 11, 2025

(54) CLOTHING FOR BIOLOGICAL SIGNAL MEASUREMENT

(71) Applicant: Toray Industries, Inc., Tokyo (JP)

(72) Inventors: Hiromi Takarada, Tokyo (JP); Ryo Matsuo, Tokyo (JP)

(73) Assignee: Toray Industries, Inc., Tokyo (JP)

( * ) Notice: Subject to any disclaimer, the term of this patent is extended or adjusted under 35 U.S.C. 154(b) by 376 days.

(21) Appl. No.: 18/027,966

(22) PCT Filed: Oct. 13, 2021

(86) PCT No.: PCT/JP2021/037915
§ 371 (c)(1),
(2) Date: Mar. 23, 2023

(87) PCT Pub. No.: WO2022/080417
PCT Pub. Date: Apr. 21, 2022

(65) Prior Publication Data
US 2023/0363681 A1    Nov. 16, 2023

(30) Foreign Application Priority Data
Oct. 13, 2020    (JP) .................................. 2020-172793

(51) Int. Cl.
*A61B 5/256* (2021.01)
*A61B 5/00* (2006.01)

(52) U.S. Cl.
CPC ............ *A61B 5/256* (2021.01); *A61B 5/6804* (2013.01)

(58) Field of Classification Search
CPC ......... A61B 5/222; A61B 5/227; A61B 5/256; A61B 5/27; A61B 5/6804
See application file for complete search history.

(56) References Cited

U.S. PATENT DOCUMENTS

| | | | | |
|---|---|---|---|---|
| 3,498,291 A | * | 3/1970 | Bunn ..................... | A61B 5/251 600/372 |
| 2010/0251454 A1 | * | 10/2010 | Kiernan ............. | A41D 13/1281 2/69 |

(Continued)

FOREIGN PATENT DOCUMENTS

| CN | 102247135 A | 11/2011 |
|---|---|---|
| CN | 108742593 A | 11/2018 |

(Continued)

OTHER PUBLICATIONS

Extended European Search Report dated Dec. 5, 2024, from counterpart European Application No. 21880154.6.

(Continued)

*Primary Examiner* — Eun Hwa Kim
(74) *Attorney, Agent, or Firm* — DLA Piper LLP (US)

(57) ABSTRACT

A clothing for biological signal measurement includes a clothing main body part; an electrode used by closely attaching on a skin side surface side of the clothing main body part; a wiring arranged on an outer surface side of the clothing main body part and electrically connected to the electrode by one end of the wiring; a metal connector including a front material and a back material, electrically connecting the other end of the wiring by fitting the front material and the back material, and connecting an electronic device to the front material; and an insulating material sealing the wiring and the back material of the metal connector.

5 Claims, 15 Drawing Sheets

(56) References Cited

U.S. PATENT DOCUMENTS

| | | | |
|---|---|---|---|
| 2013/0041272 A1* | 2/2013 | Guillen Arredondo | ............... A61B 5/6804 600/509 |
| 2013/0131484 A1 | 5/2013 | Pernu et al. | |
| 2017/0342618 A1 | 11/2017 | Hou et al. | |
| 2018/0049698 A1 | 2/2018 | Artel et al. | |
| 2020/0178623 A1 | 6/2020 | Narusawa | |

FOREIGN PATENT DOCUMENTS

| | | | |
|---|---|---|---|
| CN | 209932728 U | 1/2020 | |
| CN | 113226178 A | 8/2021 | |
| JP | 2016-106877 A | 6/2016 | |
| JP | 2017-042387 A | 3/2017 | |
| JP | 2018-143383 A | 9/2018 | |
| JP | 2019-68901 A | 5/2019 | |
| JP | 2019-92544 A | 6/2019 | |
| JP | 2019-126509 A | 8/2019 | |
| KR | 20090009645 A | 1/2009 | |
| WO | 2016201118 A1 | 12/2016 | |
| WO | 2018/221375 A1 | 12/2018 | |

OTHER PUBLICATIONS

Office Action dated Mar. 17, 2025, from counterpart Chinese Patent Application No. 202180067340.4.

David M.D. Ribeiro et al., "A Real time, Wearable ECG and Continuous Blood Pressure Monitoring System for First Responders," 33$^{rd}$ Annual International Conference of the IEEE EMBS, Aug. 30-Sep. 3, 2011, pp. 6894-6898.

International Search Report dated Dec. 28, 2021 in counterpart International Application No. PCT/JP2021/037915 w/English translation.

Written Opinion dated Dec. 28, 2021 in counterpart International Application No. PCT/JP2021/037915.

Decision to Grant dated Jul. 1, 2025, from counterpart Chinese Patent Application No. 202180067340.4.

Lin Shouhong, et al., "Impact assessment of new sick clothes in patients with electrocardiogram monitoring," Chinese Critical Care Medicine, Mar. 2019, vol. 31, No. 3, pp. 335-358.

Cheng Yanjun, "Italian Remote Monitoring Healthcare Smart Clothing," China Academic Journal Electronic Publishing House, May 2005, pp. 71-76.

* cited by examiner

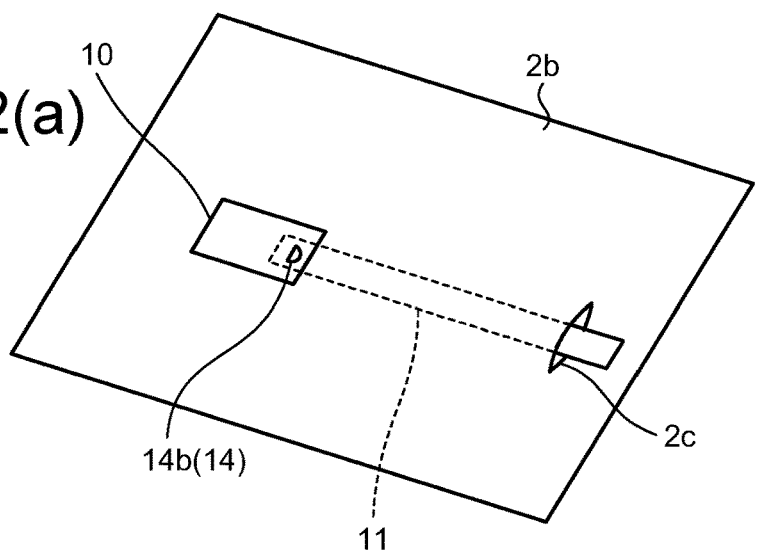
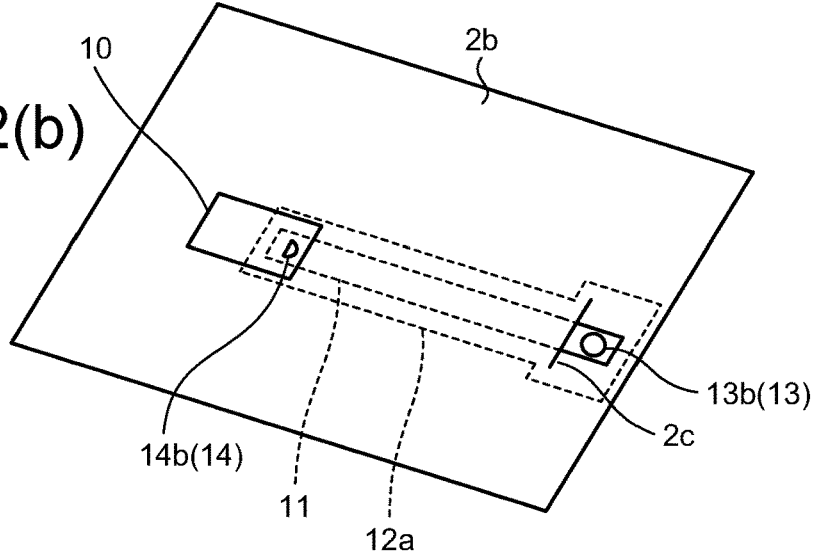
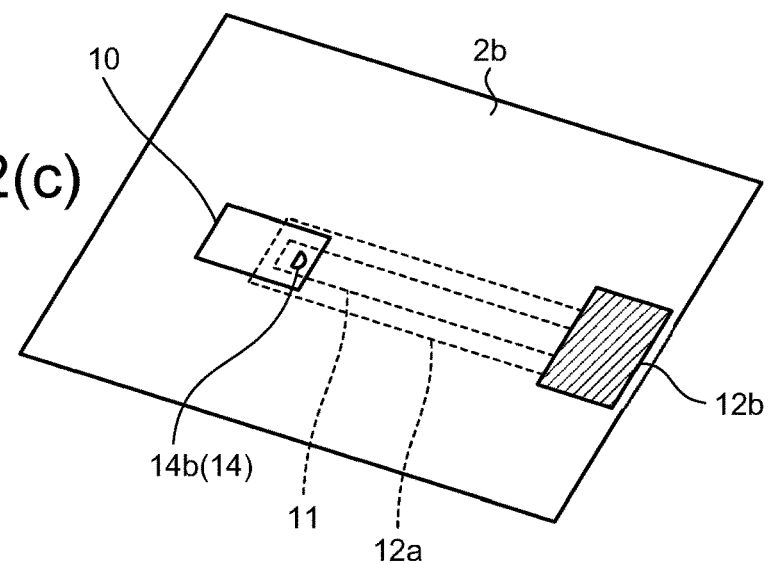

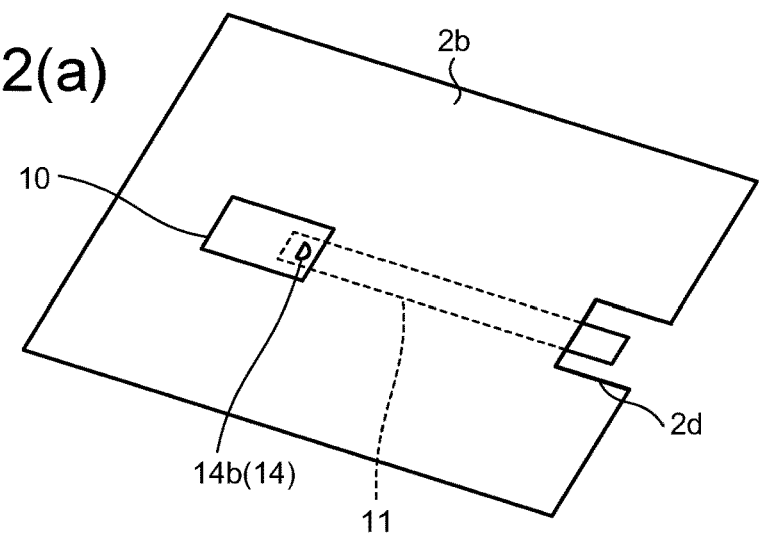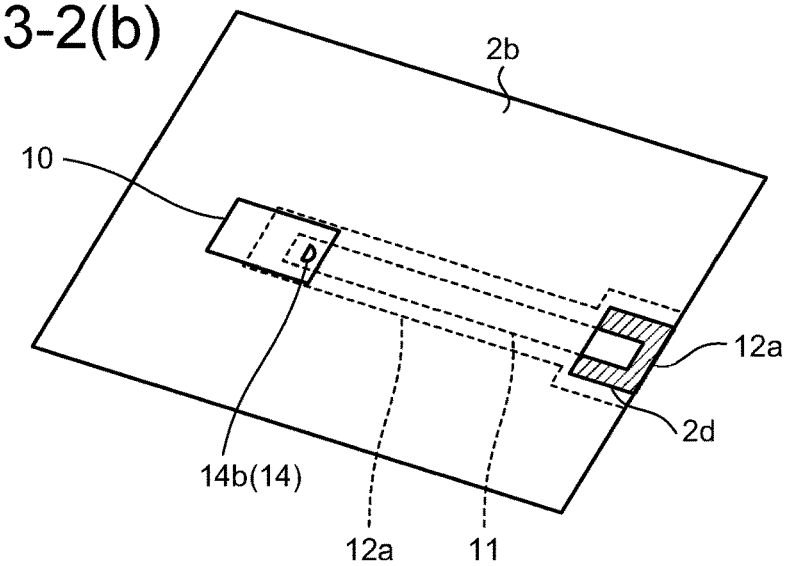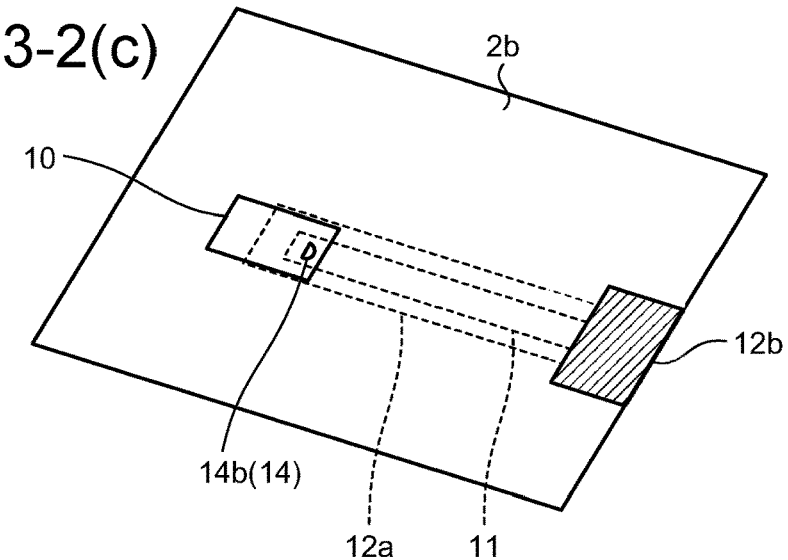

CLOTHING FOR BIOLOGICAL SIGNAL MEASUREMENT

TECHNICAL FIELD

This disclosure relates to a clothing for biological signal measurement including electrodes, wirings, and connectors, and used for a wearable device acquiring signals obtained from a living body using an electronic device worn on a human body.

BACKGROUND

In recent years, the importance of daily health management has been pointed out. As one of the methods for health management, effectiveness in the early detection of a symptom of poor physical condition or heart disease that leads to trouble by recording and analyzing bioelectrical signals such as electrocardiograms over a long period of time has been known in preventive medicine. To acquire such bioelectrical signals over a long period of time, clothing to which sensors and an electronic device are attached has attracted attention (refer to David M. D. Ribeiro et al., "A Real time, Wearable ECG and Continuous Blood Pressure Monitoring System for First Responders," $33^{rd}$ Annual International Conference of the IEEE EMBS, pp 6894-6898, 2011).

In the clothing to which the sensors are attached, the electronic device for processing and recording the electrical signals or transmitting the electrical signals to outward is required to be fixed or connected. In addition, the clothing is further required to include wirings for electrical conduction between the electronic device and electrodes and connectors for connecting the wirings to the electronic device.

As technology for the wiring and the connector, an example of connecting an electronic device serving as a heart rate sensor by attaching a conductive resin sheet including conductive particles as the electrodes and the wirings to the skin side surface of a shirt serving as a sensor, and attaching a metal hook to the wiring end and the front side of the shirt to conduct electricity has been described (WO 2018/221375). An example of attaching fiber electrodes impregnated with a conductive resin and conductive bodies serving as the wirings by connecting to the electrodes at the end on the skin side surface side of the clothing, covering the wirings with a waterproof insulating material, and connecting the other end of the wiring to a connection connector to conduct with the electronic device has been also described (Japanese Patent Application Laid-open No. 2017-42387).

In either approach, the wiring portion that transmits biological signals is required to be covered with the waterproof insulating material because contact with skin or other objects introduces noise into the biological signals.

However, the clothing for biological signal measurement provided with the waterproof-coated wiring on the skin side surface side has problems of uncomfortable wearing feeling, for example, accumulation of sweat causes heat rush to be formed because the insulating material does not absorb water and uncomfortable feeling is sensed by touching the insulating material to skin. On the other hand, when waterproof-coated wirings are provided on the outer surface side, the following problems arise.

The members used as connectors to the sensors, the electrodes, the wirings, and the electronic device are required to be fixed to a fabric serving as the base material of the clothing and thus are formed of a front material used for connecting to the external part, that is, a product called a snap or a hook made of a metal generally used as a clothing material or a similar product and a back material placed on the surface opposite to the front material sandwiching a base material such as a fabric. As the members, metal materials that a part of the back side member penetrates the fabric to deform inside of the front material by external force, whereby both of the members sandwich the fabric to fix are frequently used.

In this approach, bringing the wiring into direct contact with the metal connector over a large area is important to achieve sufficient electric conductivity of the wiring to the metal connector. On the other hand, the wiring is required to be insulated from skin and a wet cloth and thus the wirings are essentially covered with a waterproof insulating material. In addition, the wirings must be in contact with the metal connectors in a state where no insulating material exists between the wirings and the contact part of the metal connectors.

FIG. 7 is a schematic view related to an example of a metal connector structure and wiring arrangement. FIGS. 8-1(a)-(c) and 8-2(a)-(c) are views illustrating an example of an arrangement structure of the wiring (skin side surface arrangement) and the metal connector on an outer surface side and a skin side surface side not according to this disclosure. FIG. 7 illustrates a post-type metal connector 13-1 and a prong-type metal connector 13-2 as examples. FIGS. 8-1(a)-(c) and 8-2(a)-(c) illustrate attachment of an electrode 10, wiring 11, insulating materials 12a and 12b, a front material 13a, and a back material 13b over time. When the metal connector is placed on the skin side surface, the electrode 10 and the wiring 11 are first attached to a back surface 2b as illustrated in FIGS. 8-1(a) and 8-2(a). Subsequently, the insulating material 12a is attached to an outer surface 2a as illustrated in FIG. 8-1(b) and the front material 13a and the back material 13b are attached to a clothing main body part 2 as illustrated in FIG. 8-2(b). Thereafter, the insulating material 12b is attached to the back surface 2b as illustrated in FIGS. 8-1(c) and 8-2(c).

As illustrated in FIG. 7, when the front materials 13a of the metal connectors 13-1 and 13-2 are attached toward the outer surface 2a of the clothing main body part 2 to attach the electronic device, the back materials 13b of the metal connectors 13-1 and 13-2 are inevitably fixed to the skin side surface 2b side. As illustrated in FIGS. 8-1(a)-(c) and 8-2(a)-(c), direct contact of the back material 13b with the wiring 11 arranged on the skin side surface 2b side of the same surface allows a metal connector 13 to be attached in a state where the back material 13b is in contact with the wiring 11 and further both of the wiring 11 and the bottom of the back material 13b to be covered with the insulating material 12b.

FIGS. 9-1(a)-(c) and 9-2(a)-(c) are views illustrating an example of the arrangement structure of the wiring (outer surface placement) and the metal connector on the outer surface side and the skin side surface side not according to this disclosure. FIGS. 10(a)-(c) is an enlarged view of the arrangement structure of the wiring and the connector in FIGS. 9-1(a)-(c). FIGS. 9-1(a)-(c) and 9-2(a)-(c) illustrate the attachment of the electrode 10, the wiring 11, and the insulating materials 12a and 12b over time. When the metal connector is placed on the outer surface, as illustrated in FIGS. 9-1(a) and 9-2(a), the electrode 10 is first attached to the back surface 2b and the wiring 11 to the outer surface 2a to connect the electrode 10 and the wiring 11 to metal connectors 14a and 14b. Subsequently, as illustrated in FIGS. 9-1(b) and 9-2(b), the insulating material 12a is attached to the outer surface 2a and, at the same time, the front material 13a and the back material 13b are attached to the clothing main body part 2. Thereafter, the insulating material 12b is attached to the back surface 2b as illustrated in FIGS. 9-1(c) and 9-2(c).

Even when the wiring 11 and the front material 13a of the metal connector 13 are arranged on the same outer surface 2a, the wiring 11 is required to be covered with the insulating material 12a and the metal connector 13 is required to have a hole part 12c in the insulating material 12a and the front material 13a is required to be exposed through the hole part 12c so that the metal connector 13 functions as a connector. As illustrated in FIG. 10(b), however, when the hole part 12c of the insulating material 12a is enlarged to improve conductivity, the wiring 11 in the vicinity of the metal connector 13 is exposed. Therefore, as illustrated in FIG. 10(c), when the insulating material 12a is attached and thereafter the front material 13a of the metal connector 13 is fixed thereon to secure insulation properties, the conduction cannot be secured. When a small hole part 12c is formed in the insulating material 12a to such a degree that the hole part 12c is hidden under the front material 13a of the metal connector 13, poor connection due to insufficient contact between the metal connector 13 and the wiring 11 may occur.

It could therefore be helpful to provide a clothing for biological signal measurement that is comfortable in wear feeling and has excellent conductivity and insulation properties by arranging wirings arranged on the outer surface side of the clothing main body part to the skin side surface side through a cutout part provided in the clothing main body part.

SUMMARY

We provide a clothing for biological signal measurement. The clothing includes: a clothing main body part; an electrode used by closely attaching on a skin side surface side of the clothing main body part; a wiring arranged on an outer surface side of the clothing main body part and electrically connected to the electrode by one end of the wiring; a metal connector including a front material and a back material, electrically connecting the other end of the wiring by fitting the front material and the back material, and connecting an electronic device to the front material; and an insulating material sealing the wiring and the back material of the metal connector. The wiring is arranged from the outer surface side to the skin side surface side through a cutout part provided in the clothing main body part and connected by direct contact with the back material of the metal connector penetrating the clothing main body part from a front side to a back side of the clothing main body part, and the insulating material is configured to seal the cutout part.

A fabric part covering the wiring arranged on a surface of an outer side of the clothing main body part is sewn to a body of the clothing main body part. This makes the wiring and the insulating material invisible from a front side of the clothing when the clothing is put on, thus providing the clothing for biological signal measurement with excellent design properties.

Further, we provide clothing for biological signal measurement in which a front body of the clothing main body part is formed of a right front body and a left front body, and the right front body and the left front body are capable of being opened and closed, the electrode, the wiring, and the metal connector are provided on each of the right front body and the left front body, and the electronic device is connected to the metal connector of each of the right front body and the left front body by stepping over an opening and closing part of the right front body and the left front body.

Moreover, the clothing for biological signal measurement further includes an adapter having a first connector and a second connector, the first connector being on a front surface side of the adapter and connecting the electronic device, the second connector being on a back surface side of the adapter and connecting to the metal connector. This provides the clothing for biological signal measurement, which allows the electronic device to be easily attached to the front of the body.

Furthermore, we provide clothing for biological signal measurement in which the adapter includes an adapter main body constituted of a textile and formed by folding the textile in two, the first connector and the second connector are arranged on one surface of the textile, a wiring connecting the first connector and the second connector is arranged on an opposite side surface of the textile, and the wiring is sealed with an insulating material, and the adapter main body is folded in two so that each of the first connector and the second connector is exposed on both surfaces of the adapter main body.

According to our clothing for biological signal measurement, the wiring can be arranged on the outer surface side of the clothing main body part so that the wiring does not touch to skin and can achieve conduction with the metal connector. Therefore, the clothing for biological signal measurement is excellent in design properties and functionality.

In addition, the clothing for biological signal measurement having a front-opening structure is very easy to be put on and taken off and easy to attach an electronic device. Consequently, discomfort feeling when the wearer puts on and takes off the clothing can be reduced and damage to the wiring caused by forcing the wearer's body passing through the clothing when the clothing is put on and taken off can be prevented.

BRIEF DESCRIPTION OF THE DRAWINGS

FIGS. 2-2(a)-(c) are partial views illustrating a wiring structure on the skin side surface side of the clothing for biological signal measurement according to the first example.

FIGS. 3-1(a)-(c) are partial views illustrating a wiring structure on the outer surface side of the clothing for biological signal measurement according to a modified example of the first example FIGS. 3-2(a)-(c) are partial views illustrating a wiring structure on the skin side surface side of the clothing for biological signal measurement according to a modified example of the first example.

FIG. 5-1 is a schematic view illustrating clothing for biological signal measurement and an electronic device according to a third example.

FIG. 5-2 is a schematic view illustrating clothing for biological signal measurement and an electronic device according to a modified example of the third example.

FIGS. 8-1(a)-(c) are views illustrating an example of a conventional arrangement structure of a wiring (skin side surface placement) and a metal connector on an outer surface side.

FIGS. 8-2(a)-(c) are views illustrating an example of a conventional arrangement structure of the wiring (skin side surface placement) and the metal connector on a skin side surface side.

FIGS. 9-1(a)-(c) are views illustrating an example of a conventional arrangement structure of the wiring (outer surface placement) and the metal connector on the outer surface side.

FIGS. 9-2(a)-(c) are views illustrating an example of a conventional arrangement structure of the wiring (outer surface placement) and the metal connector on the skin side surface side.

REFERENCE SIGNS LIST

Figure 1:
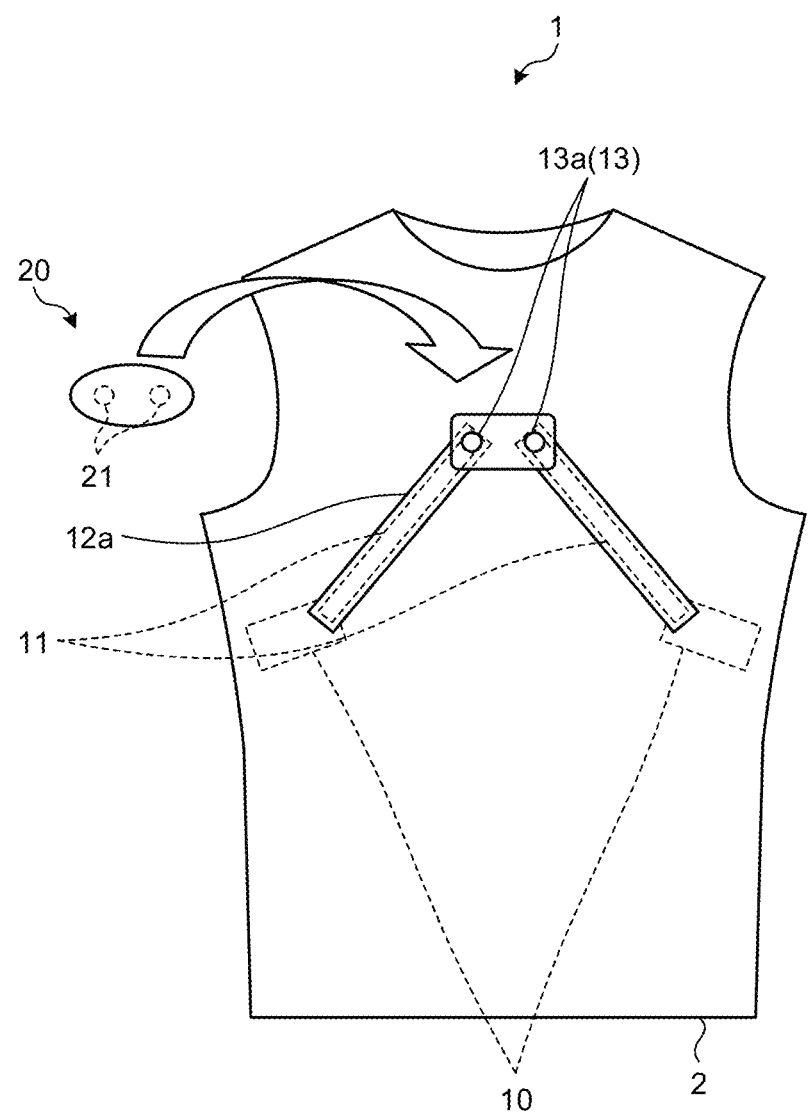
FIG. 1 is a schematic view illustrating clothing for biological signal measurement and an electronic device according to a first example.

1 Clothing for biological signal measurement
2 Clothing main body part
2a Outer surface
2b Skin side surface
2c Cutout part
2d Hollow structure
2-1 Right front body
2-2 Left front body
3 Fabric part
4 Fastener
10 Electrode
11 Wiring
12a, 12b Insulating material
13 Metal connector
14 Connector
20, 20D Electronic device
21, 21D Connector
30 Adapter
31 Adapter main body
32 First connector
33 Second connector

DETAILED DESCRIPTION

Hereinafter, the suitable examples will be described with reference to the drawings. This disclosure, however, is not limited to such examples.

First Example

Figures 1A, 2:
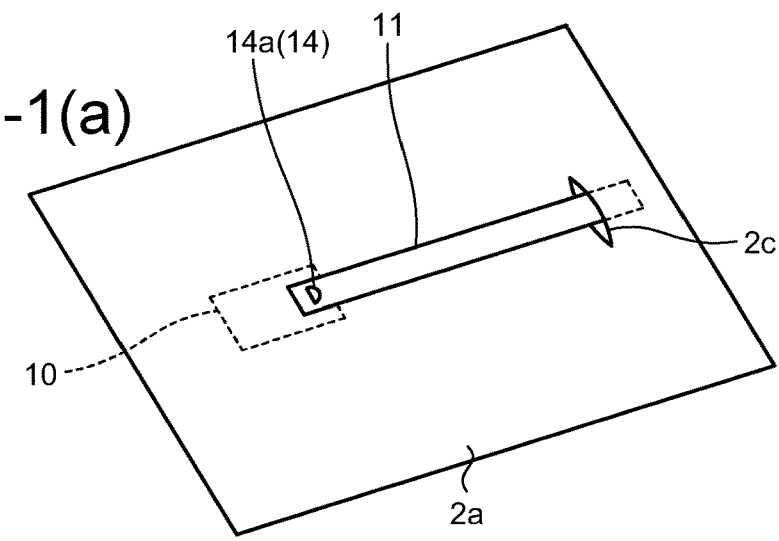
FIGS. 2-1(a)-(c) are partial views illustrating a wring structure on the outer surface side of the clothing for biological signal measurement according to the first example.

FIG. 1 is a schematic view illustrating a first example of the clothing for biological signal measurement. FIGS. 2-1(a)-(c) are partial views illustrating a wiring structure on the outer surface side of the clothing for biological signal measurement according to the first example and FIGS. 2-2(a)-(c) are partial views illustrating a wiring structure on the skin side surface side of the clothing for biological signal measurement according to the first example. FIGS. 2-1(a)-(c) and 2-2(a)-(c) illustrate the attachment of an electrode 10, a wiring 11, and insulating materials 12a and 12b over time. In clothing for biological signal measurement 1, the electrodes 10 are placed on the skin side surface under the chest in the vicinity of the sides of a clothing main body part 2, and one ends of the wirings 11 are connected to the electrodes 10. The wirings 11 are arranged on an outer surface 2a of the clothing main body part 2 and is electrically connected with the electrodes 10 arranged on the skin side surface side and connectors 14 (14a and 12b) having a structure formed of the front material and the back material similar to metal connectors 13 described below. The wirings 11 are entirely covered with the insulating materials 12a and 12b.

Natural fiber materials such as cotton and wool and synthetic fiber materials such as polyester and nylon used in ordinary clothing products can be used as the material for the clothing main body part 2 without any limitation.

The material of the electrodes 10 is not particularly limited and commercially available medical Ag/AgCl electrodes with electrolyte paste, carbon filler mixed resins, Ag fabrics, conductive polymer-impregnated fabrics, and fabrics into which electrolytes are permeated can be used without limitation. The electrodes 10 are preferably formed by using the conductive polymer-impregnated fabric, whereby irritation to skin to which the electrodes 10 are closely attached can be reduced and durability can be improved.

The electrodes 10 can be placed on a skin side surface 2b side of the clothing main body part 2 at two positions where a heart is sandwiched. Measuring potential difference from the heart allows the heart potential and the heart rate to be measured. As other measurements, the electrodes 10 are placed at positions corresponding to the muscles of the human body such as upper arm muscles, abdominal muscles, and quadriceps muscles, whereby muscle potential can be acquired.

As methods of fixing the electrodes 10 to the clothing main body part 2, a method of sewing the electrodes 10 to the clothing main body part 2, a method of bonding the electrodes 10 using a thermocompression bonding material, or a method of directly printing a conductive material serving as the electrodes 10 on the clothing main body part 2 may be exemplified and these methods can be arbitrarily used. Alternatively, snaps can be placed at the positions where the electrodes 10 is fixed on the clothing main body part 2 to fasten the removable electrodes 10.

As the wirings 11, known wiring materials can be used without limitation. It is important that the material is flexible and durable to washing because the wirings 11 are arranged on the clothing main body part 2. The wirings 11 are also required to be covered with the insulating materials 12a and 12b to not acquire signals from the human body and the like other than the site where the electrodes 10 are placed. In addition, a structure in which the insulating material is further sandwiched between the clothing main body part 2 and the wirings 11 is preferably formed so that the wirings 11 are also insulated from the arranged clothing main body part 2.

At the center of the chest of the clothing main body part 2, the metal connectors 13 each connected to the other ends of the wirings 11 extending from the electrodes 10 are arranged. An electronic device 20 is attached to the metal connectors 13 and the potential difference information from the heart measured by the electrodes 10 can be acquired through the wirings 11 and the metal connectors 13. The electronic device 20 can be attached to and detached from the front materials 13a of the metal connectors 13 using connectors 21.

Figure 7:
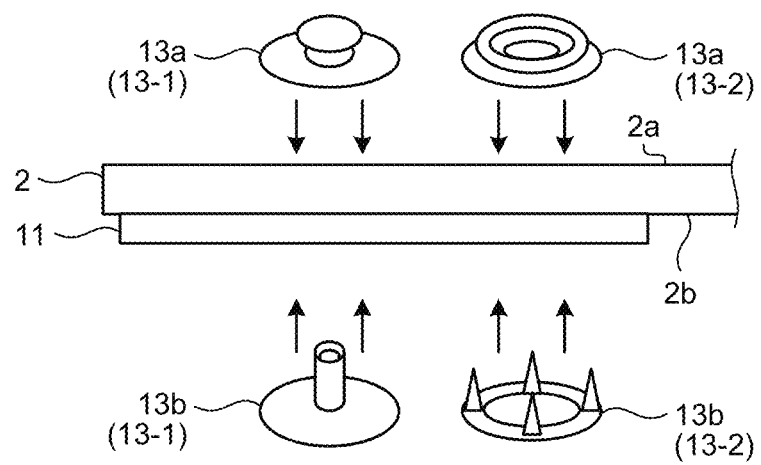
FIG. 7 is a schematic view illustrating the structures of metal snaps used for metal connectors.

The metal connectors 13 are not particularly limited as long as the metal connectors are formed of metal and achieves electric conductivity between the front side and the back side by interlocking the front material 13a and the back material 13b from both surfaces of the clothing main body part 2 and partially penetrating. Use of metal connectors 13-1 and 13-2 having a structure illustrated in FIG. 7 allows passing properties at the sewing process to be excellent and handling to be easily performed.

In the clothing for biological signal measurement 1 illustrated in FIG. 1, the wirings 11 are not arranged on the skin side surface 2b of the clothing main body part 2 but arranged on the outer surface 2a side, which is an opposite surface to the skin side surface 2b, and thus steamy feeling or abrasion of skin caused by direct contact of the wirings 11 and the insulating material 12a covering the wirings 11 with skin is not felt.

Figures 1B, 2:
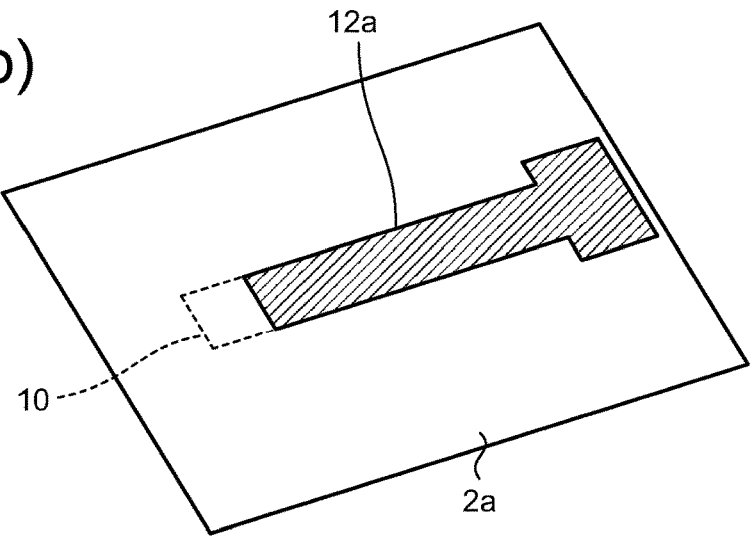
Figures 1C, 2:
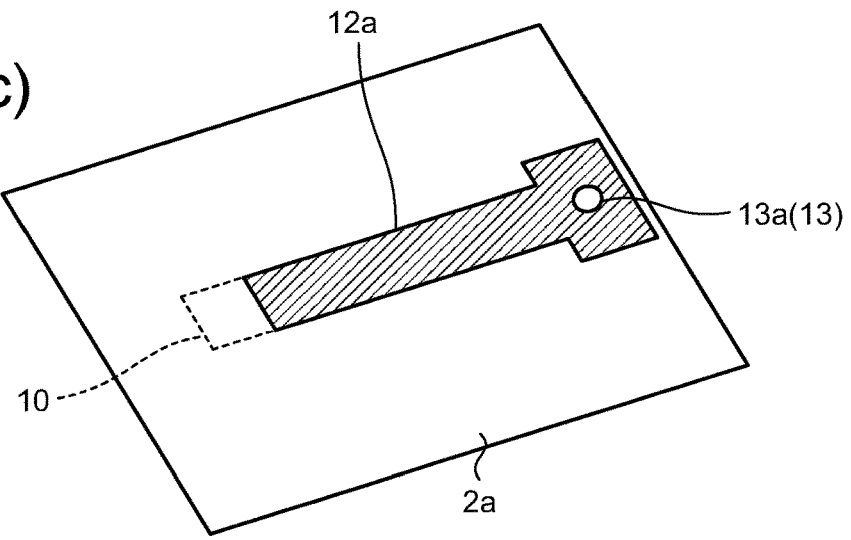

A cutout part 2c is provided in the clothing main body part 2 to achieve both directions of the arrangement of the wiring 11 and the arrangement of the front materials 13a of the metal connectors 13 to which the electronic device 20 is attached are not on the skin side surface 2b side but on the outer surface 2a side of the clothing main body part 2. Through this cutout part 2c, the wiring 11 is exposed on the skin side surface 2b side opposite to the outer surface 2a side (refer to FIGS. 2-1(a) and 2-2(a)). The wiring 11 and the cutout part 2c arranged on the outer surface 2a side of the clothing main body part 2 are covered with the insulating material 12a (refer to FIG. 2-1(b)). The back material 13b of the metal connector 13 is in direct contact with the wiring 11 exposed on the skin side surface 2b side to fit the front material 13a and back material 13b together to sandwich the clothing main body part 2 and the wiring 11, whereby the wiring 11 is conducted with the metal connector 13 (refer to FIGS. 2-1(c) and 2-2(b)). The wiring 11 exposed on the skin side surface 2b side is covered by the insulating material 12b together with the cutout part 2c in the clothing main body part 2 and the back material 13b of the metal connector 13 (refer to FIG. 2-2 (c)). The electronic device 20 is connected to the front material 13a of the metal connector 13 exposed above the insulating material 12a. Forming the structure as described above allows both sufficient conduction of the wiring 11 and the metal connector 13 and sufficient insulation of the wiring to be satisfied.

Figures 1A, 3:
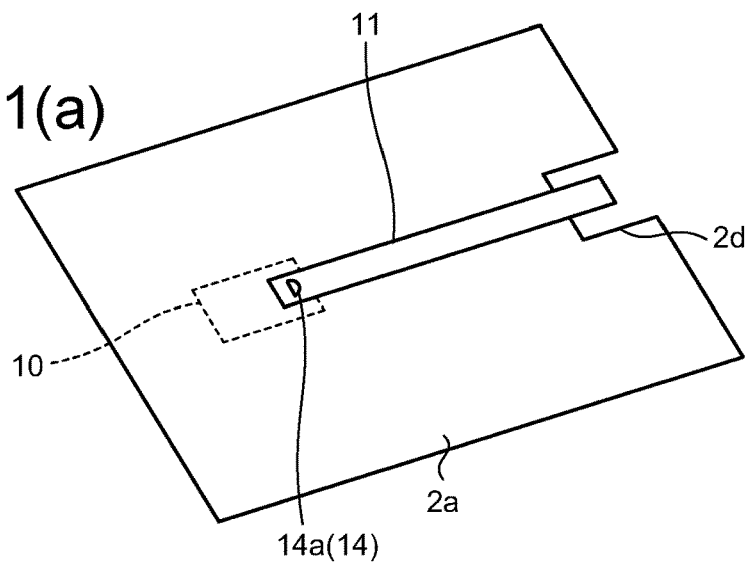
Figures 1B, 3:
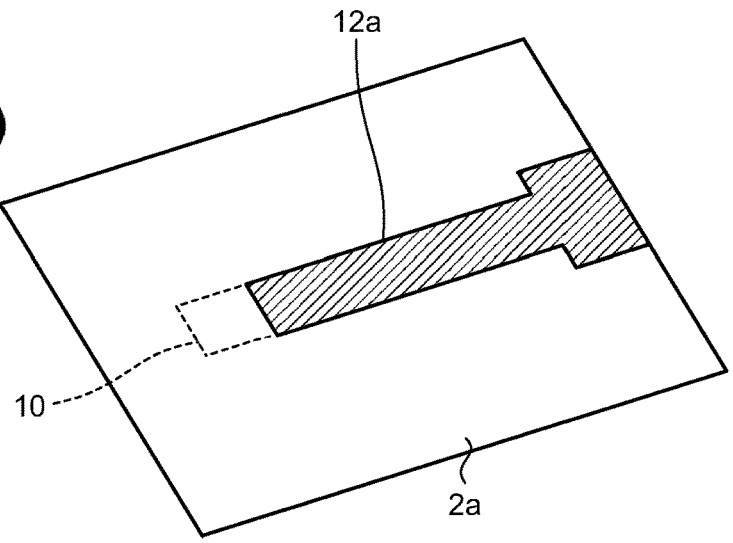
Figures 1C, 3:
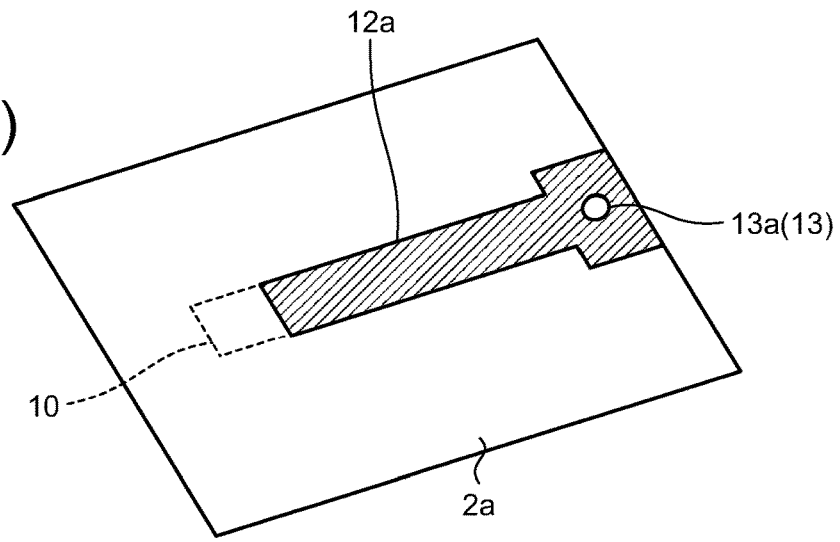

The cutout part 2c in the clothing main body part 2 for exposing the wiring 11 to the skin side surface 2b side may be a hole-shaped part into which the wiring 11 is inserted as illustrated in FIGS. 2-1(a) and 2-2(a). Alternatively, the cutout part 2c may be replaced by a hollow structure 2d as illustrated in FIGS. 3-1(a) and 3-2(a). In any event, together with preventing fraying and improving strength, it is important that the wiring 11 and the cutout 2c or the hollow structure 2d in the clothing main body part 2 are covered with the insulating material 12a arranged on the outer surface 2a side and the insulating material 12b arranged on the skin side surface 2b side and, after achieving conduction with the wiring 11, the back material 13b of the metal connector 13 on the skin side surface 2b side is also covered with the insulating material 12b from above the conducted wiring 11, whereby the front material 13a on the outer surface 2a alone is exposed.

Figures 1A, 8:
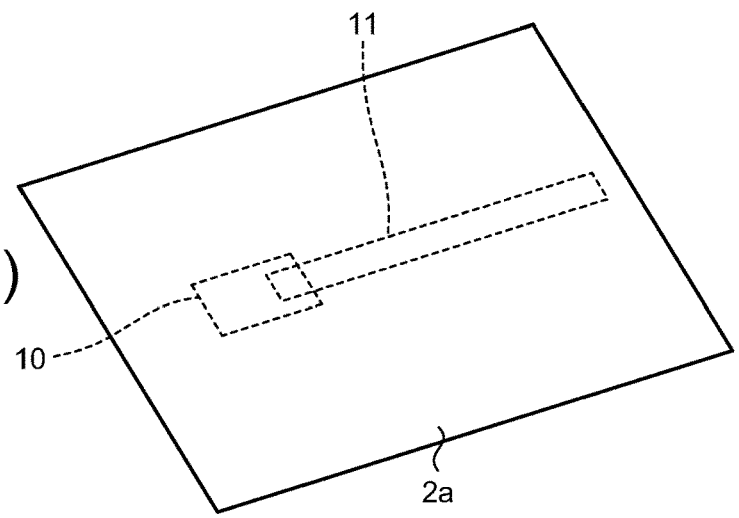
Figures 1B, 8:
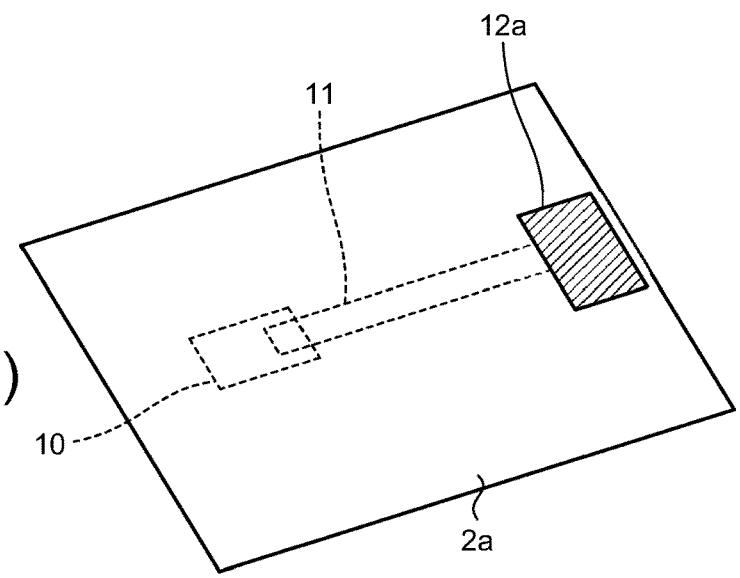
Figures 1C, 8:
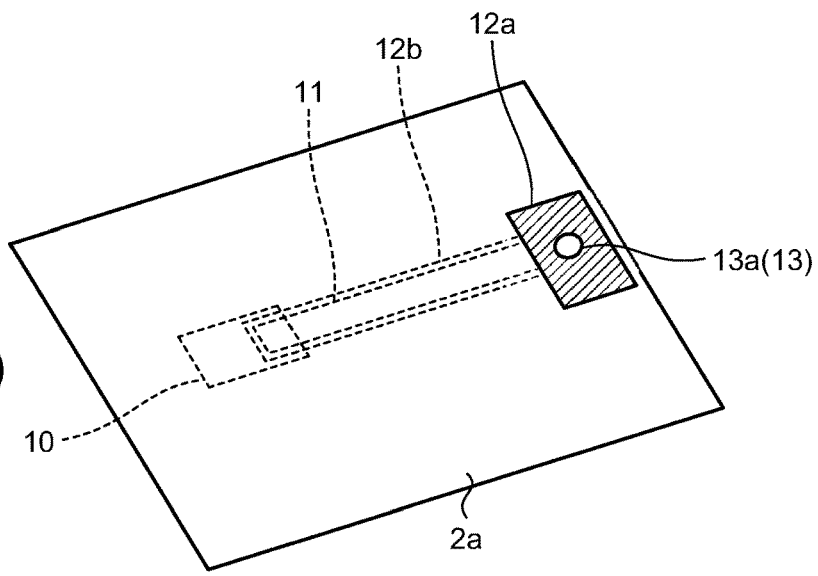
Figures 2A, 8:
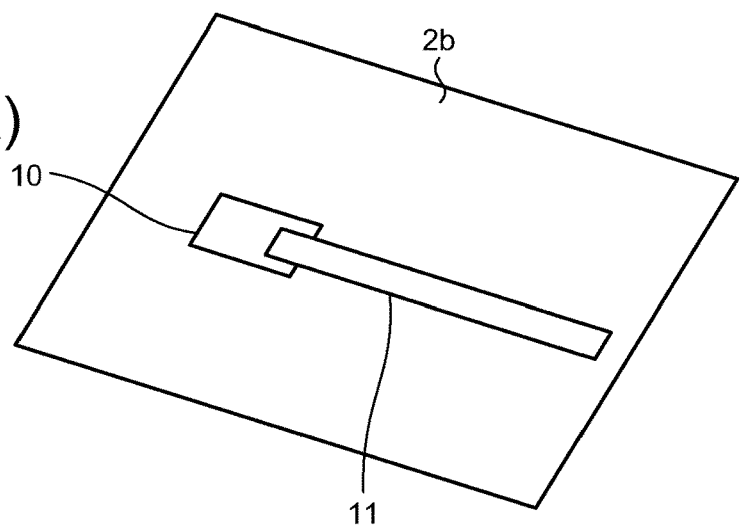
Figures 2B, 8:
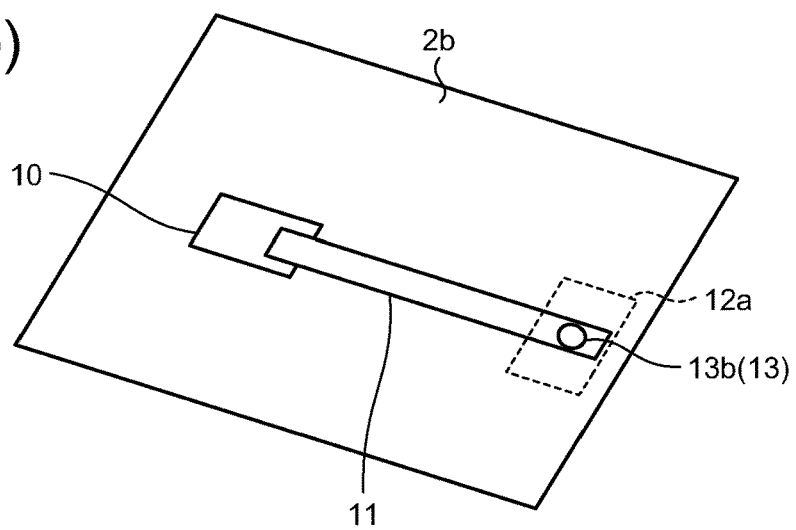
Figures 2C, 8:
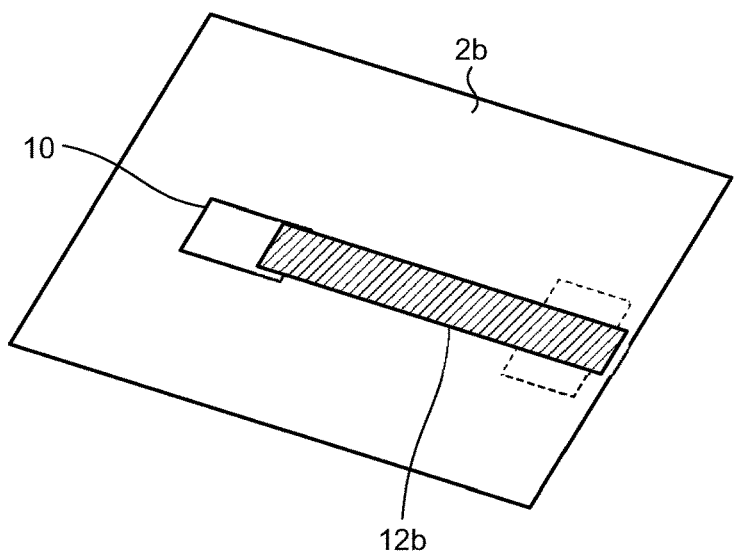
Figures 1A, 9:
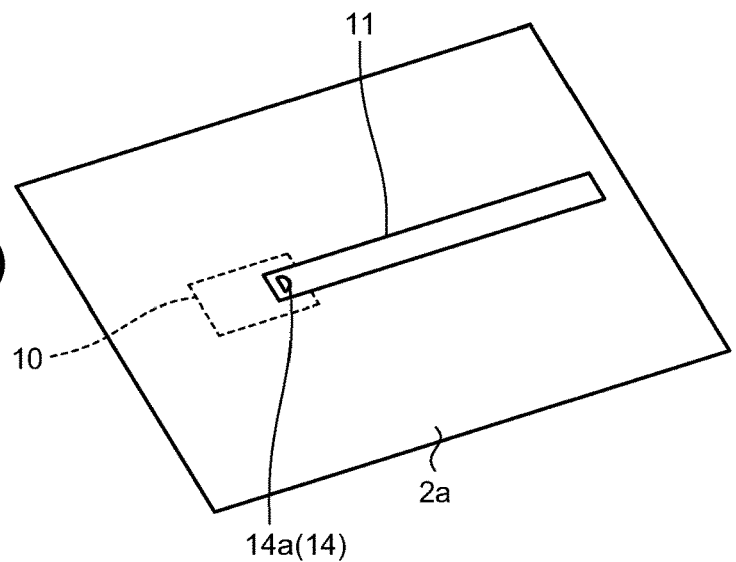
Figures 1B, 9:
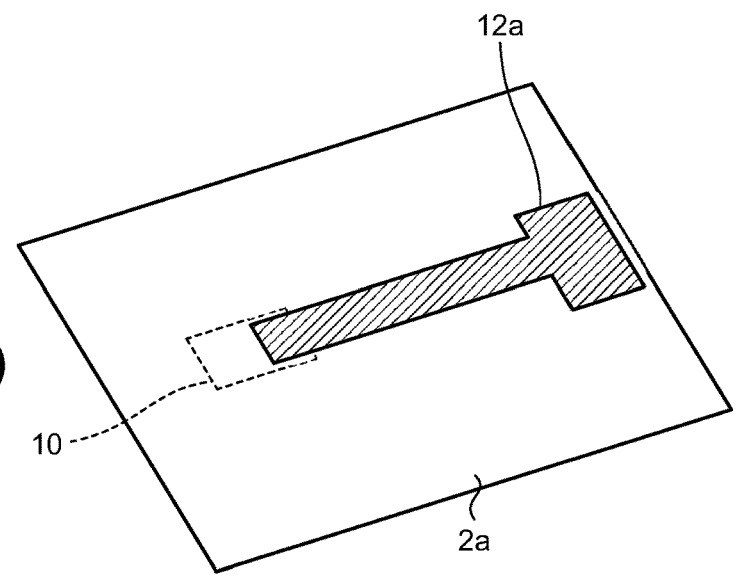
Figures 1C, 9:
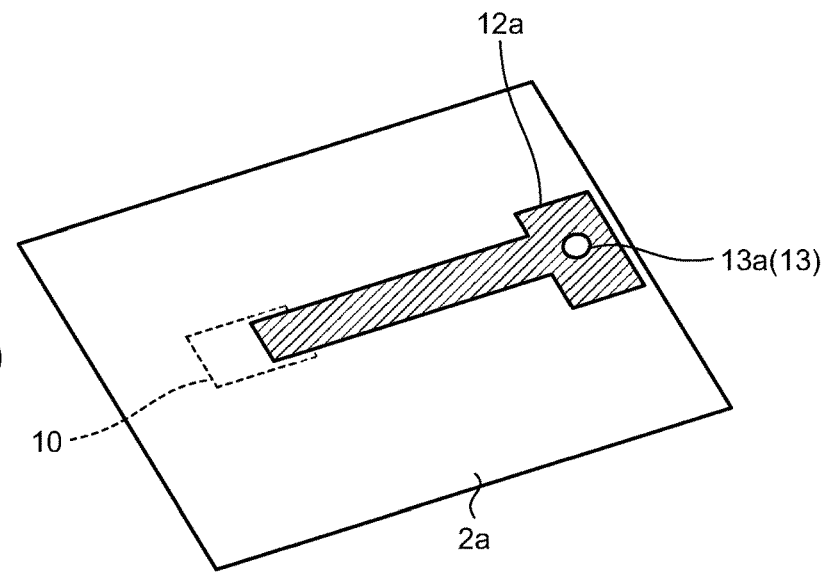
Figures 2A, 9:
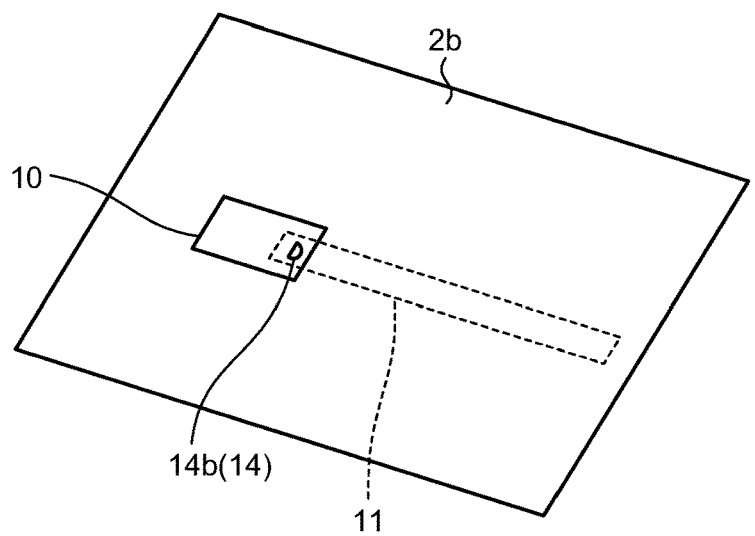
Figures 2B, 9:
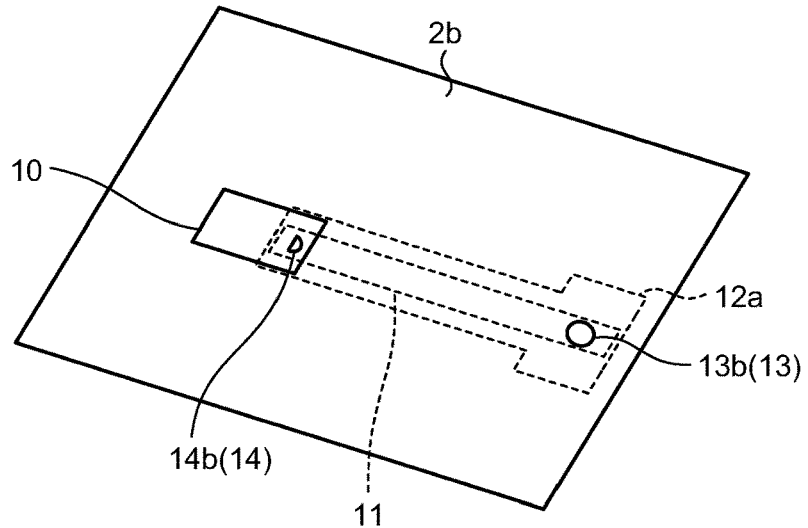
Figures 2C, 9:
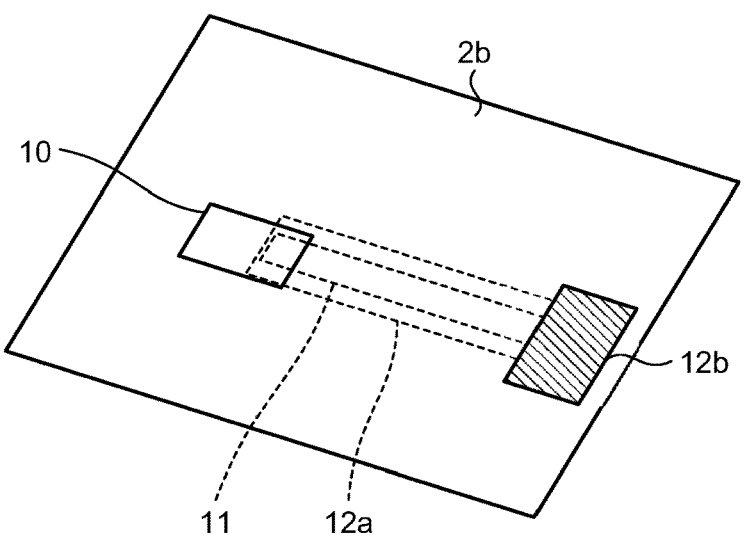
Figure 10A:
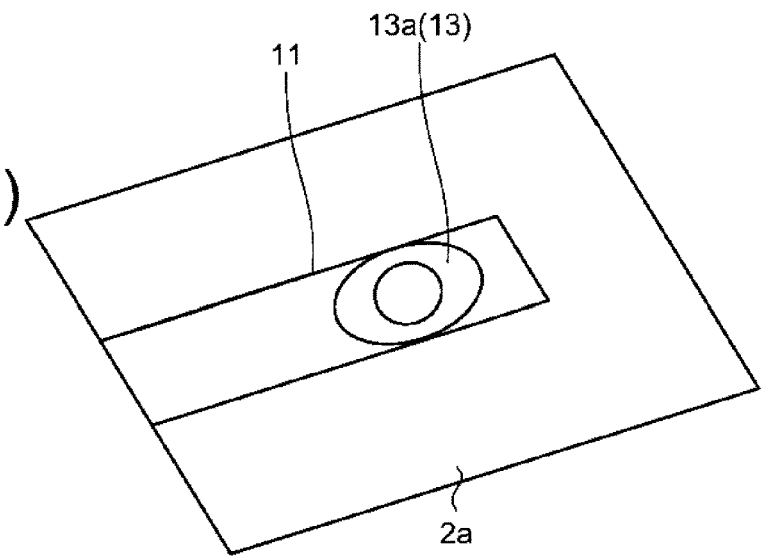
FIGS. 10(a)-(c) are enlarged views of the arrangement structure of the wiring and the connector in FIGS. 9-1(a)-(c).
Figure 10B:
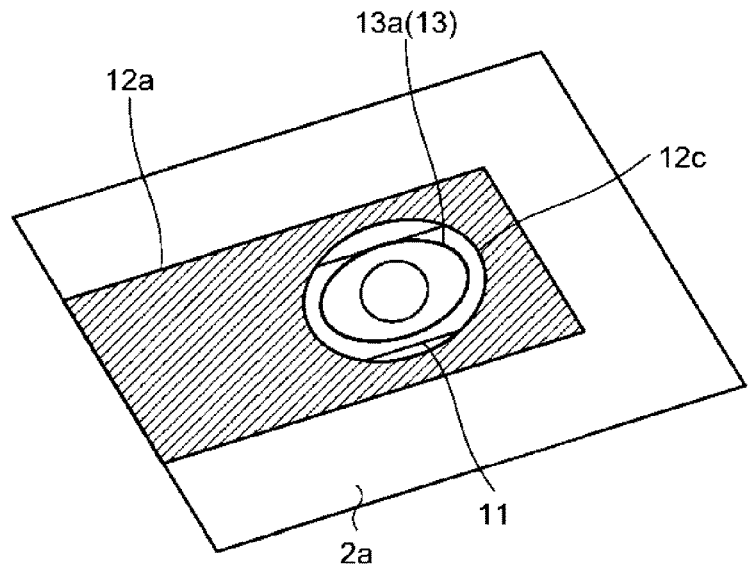
Figure 10C:
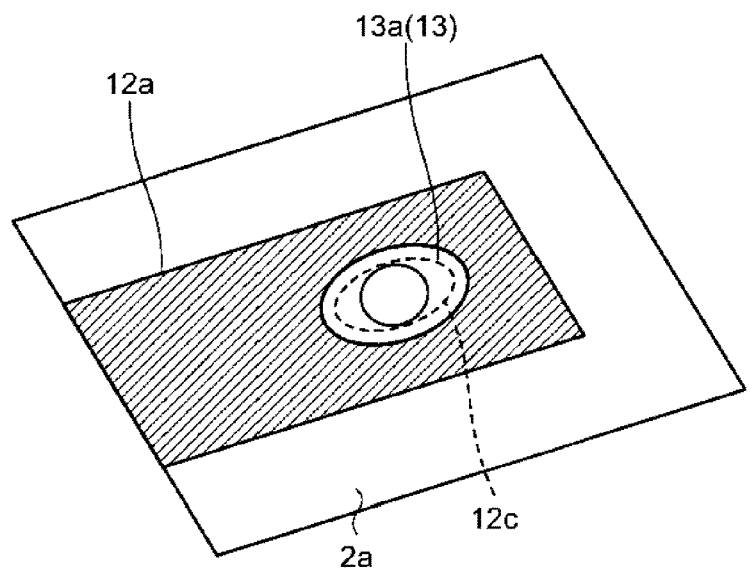

On the other hand, as conventional clothing for biological signal measurement, arrangement of the wiring 11 on the skin side surface 2b side as illustrated in FIGS. 8-2(a)-(c) causes the area where the insulating material 12b directly touches the skin to be large because the insulating material 12b covering the wiring 11 is arranged on the skin side surface 2b side. Consequently, steamy felling and friction feeling become larger. On the other hand, when the wiring 11 is arranged on the outer surface 2a side of the clothing main body part 2 so that the wiring 11 does not touch the skin, the front material 13a of the metal connector 13 is in direct contact with the wiring 11 to achieve connection as illustrated in FIGS. 9-1(a)-(c). Fixing the front material 13a of the metal connector 13 from above the front material 13a after applying the insulating material 12a to completely cover the wiring 11 with the insulating material 12a results in not securing conduction with the wiring 11. Even when a small hole part 12c is provided in the insulating material 12a, production efficiency deteriorates because contact between the metal connector 13 and the wiring 11 is likely to be insufficient when the wiring 11 and the metal connector 13 are slightly misaligned and time and effort are required for preparation.

Alternatively, when the hole part 12c in the insulating material 12a is enlarged to improve conductivity, the wiring 11 in the vicinity of the front material 13a is inevitably exposed due to insufficient insulation, which causes noise and also deteriorates design properties. In the clothing for biological signal measurement 1 according to the first example, the wiring 11 is mainly provided on the outer surface 2a side of the clothing main body part 2 and thus steamy feeling and abrasion of skin caused by direct contact of the insulating material 12b with the skin can be reduced. The wiring 11 is in direct contact with the back material 13b of the metal connector 13 to achieve conduction with the metal connector 13 and the wiring 11 can be completely covered with the insulating materials 12a and 12b and thus high conductivity and insulation properties can be retained.

Second Example

Figure 4:
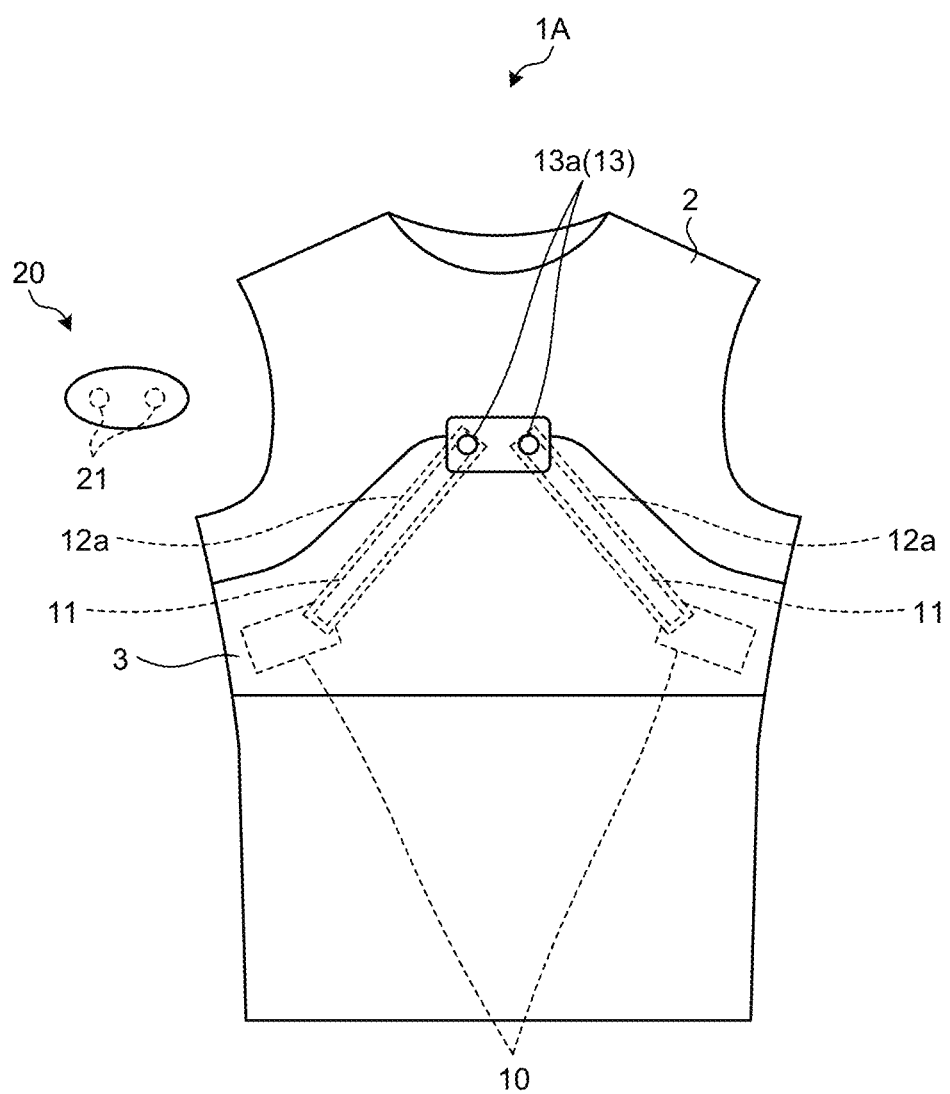
FIG. 4 is a schematic view illustrating clothing for biological signal measurement and an electronic device according to a second example.

FIG. 4 is a schematic view illustrating one example of the clothing for biological signal measurement according to the second example. In clothing for biological signal measurement 1A according to the second example, a fabric part 3 is sewn to the clothing main body part 2 to cover the wirings 11 arranged on the outer surface 2a side of the clothing main body part 2 in the clothing for biological signal measurement 1 according to the first example. In this example, the wirings 11 are hidden in the fabric part 3 and thus the design properties of appearance do not deteriorate. The metal connectors 13 for connecting the electronic device 20 are arranged further above this fabric part 3 and thus the installation and removal of the electronic device 20 are not interrupted. Similar to the clothing for biological signal measurement 1 according to the first example, in the clothing for biological signal measurement 1A, the wirings 11 are placed on the outer surface of the clothing main body part 2 and one ends of the wirings 11 are electrically connected by the connectors to the electrode 10 arranged on the skin side surface side. The other ends of the wirings 11 are exposed on the skin side surface side by a cutout or a hollow structure not illustrated in FIG. 4 and bringing direct contact with the back material of the metal connectors 13 to achieve conduction between the wirings 11 and the metal connectors 13. The cutout or the hollow structure and the back material of the metal connectors 13 are covered with the insulating material.

In addition, this fabric part 3 provides the effect of obtaining the clothing for biological signal measurement 1A having excellent signal acquisition performance and wearing feeling because when not only the wirings 11 but also the upper part of the electrodes 10 placed on the skin side surface 2b are covered, the double-layered part where the clothing main body part 2 and the fabric part 3 are overlapped generate the effect of pressing the electrodes 10 to the skin to prevent the electrodes 10 from slipping even when the clothing main body part 2 has loose stretch. The fabric part 3 may be formed of the same or different material as or from the clothing main body part 2. When the clothing main body part 2 is covered with a belt-like fabric part 3 to the back surface to form a double-layer structure, the entire circumference of the clothing main body part 2 is doubled in the necessary part alone, whereby the stretch power of the clothing for biological signal measurement 1A by which the electrodes 10 are pressed to the skin to be fixed is further improved, and thus the signal acquisition performance is excellent. Similar to the first example, the wirings 11 are arranged on the outer surface side and thus an area where the insulating material is in direct contact with the skin is small. Therefore, the steamy feeling and abrasion of skin caused by the insulating material can be reduced and both sufficient conduction between the wirings 11 and the metal connectors 13 and sufficient insulation of the wirings can be satisfied.

Third Example

Figures 1, 5:
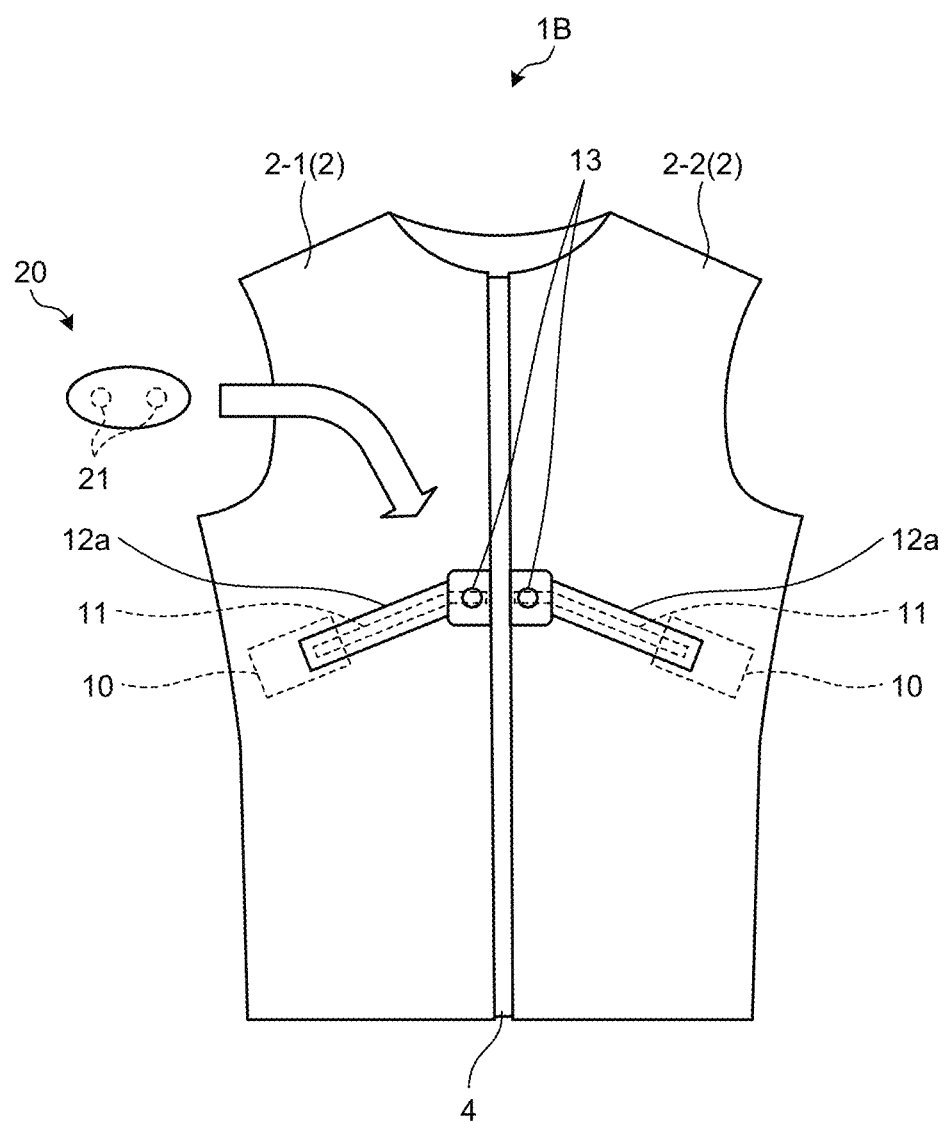
Figures 2, 5:
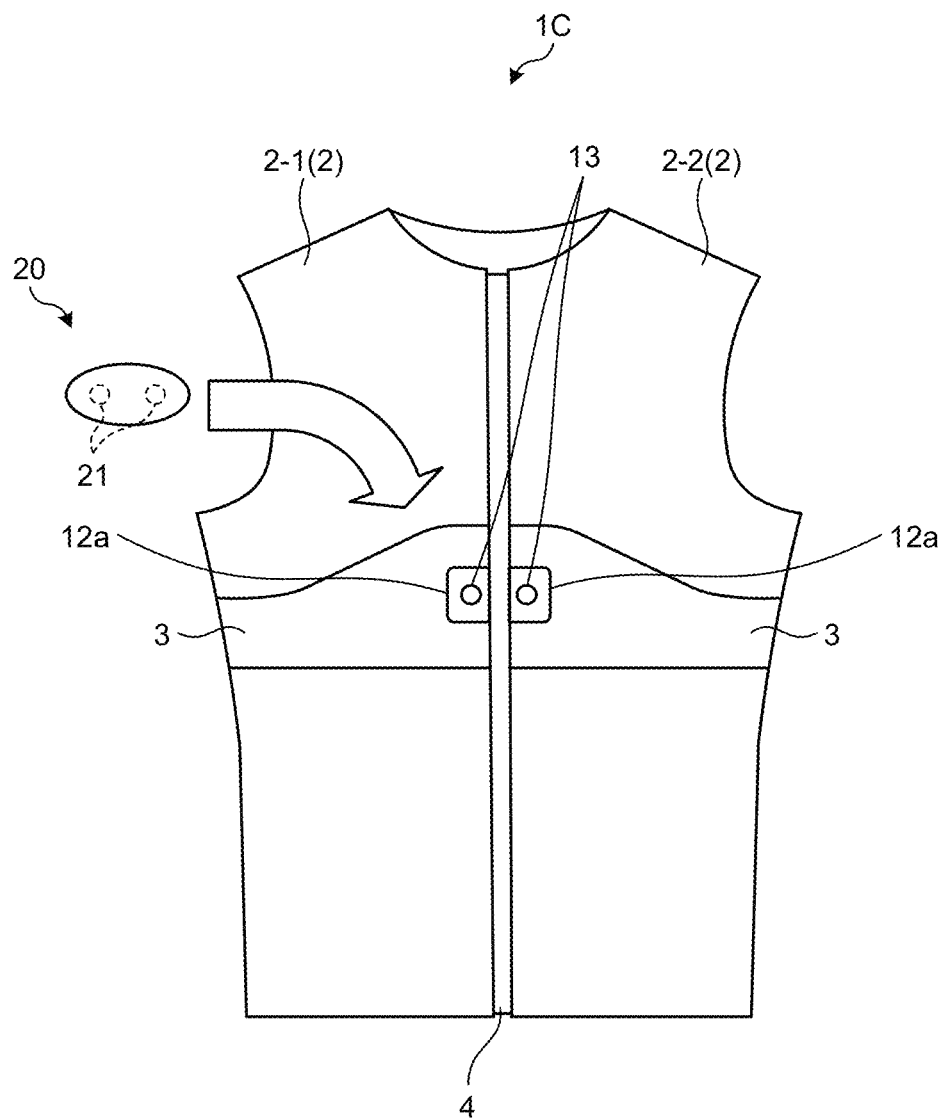

FIG. 5-1 is a schematic view illustrating the clothing for biological signal measurement according to the third example. In clothing for biological signal measurement 1B, the front body of the clothing main body part 2 is formed of a right front body 2-1 and a left front body 2-2. A fastener 4 that can be opened and closed is attached between the right front body 2-1 and the left front body 2-2. The electrode 10, the wiring 11, and the metal connector 13 are provided on each of the right front body 2-1 and left front body 2-2. In the clothing for biological signal measurement 1B, similar to the clothing for biological signal measurement 1 according to the first example, the wirings 11 are placed on the outer surface of the clothing main body part 2 and one ends of the wirings 11 are electrically connected by the connectors to the electrodes 10 that are arranged on the skin side surface side. The other ends of the wirings 11 are exposed on the skin side surface side by the cutout or the hollow structure not illustrated in FIG. 5-1 and bringing direct contact with the back material of the metal connectors 13 to achieve conduction between the wirings 11 and the metal connectors 13. The cutout or the hollow structure and the back material of the metal connectors 13 are covered with the insulating material.

The electronic device 20 can be connected to the metal connectors 13 on the right front body 2-1 and left front body 2-2 in the form of stepping over the fastener 4. The clothing for biological signal measurement 1B is very easy to be put on and taken off even when the clothing main body part 2 is served as a compression wear formed by using a fabric with high stretch properties to ensure close attachment properties of the electrodes 10 to the skin. The clothing for biological signal measurement 1B also has the advantages of being easy to be taken off even when the fabric sticks to the skin due to perspiration and being easy to be put on even when stretch in the chest area is tight because a head or shoulders are not required to pass through when the clothing for biological signal measurement 1B is put on. In addition, similar to the first example, the wirings 11 are arranged on the outer surface side and thus an area where the insulating material is in direct contact with the skin is small. Therefore, the steamy feeling and abrasion of skin caused by the insulating material can be reduced and both sufficient conduction between the wirings 11 and the metal connectors 13 and sufficient insulation of the wirings can be satisfied. Clothing for biological signal measurement 1C illustrated in FIG. 5-2 is clothing having the same configuration as the clothing for biological signal measurement 1B and allowing the front body to be fully opened except that the fabric part 3 is sewn such that the wirings 11 are hidden. In addition to having the same effect as the clothing for biological signal measurement 1B, the clothing for biological signal measurement 1C has excellent design properties and signal acquisition performance.

Fourth Example

Figure 6:
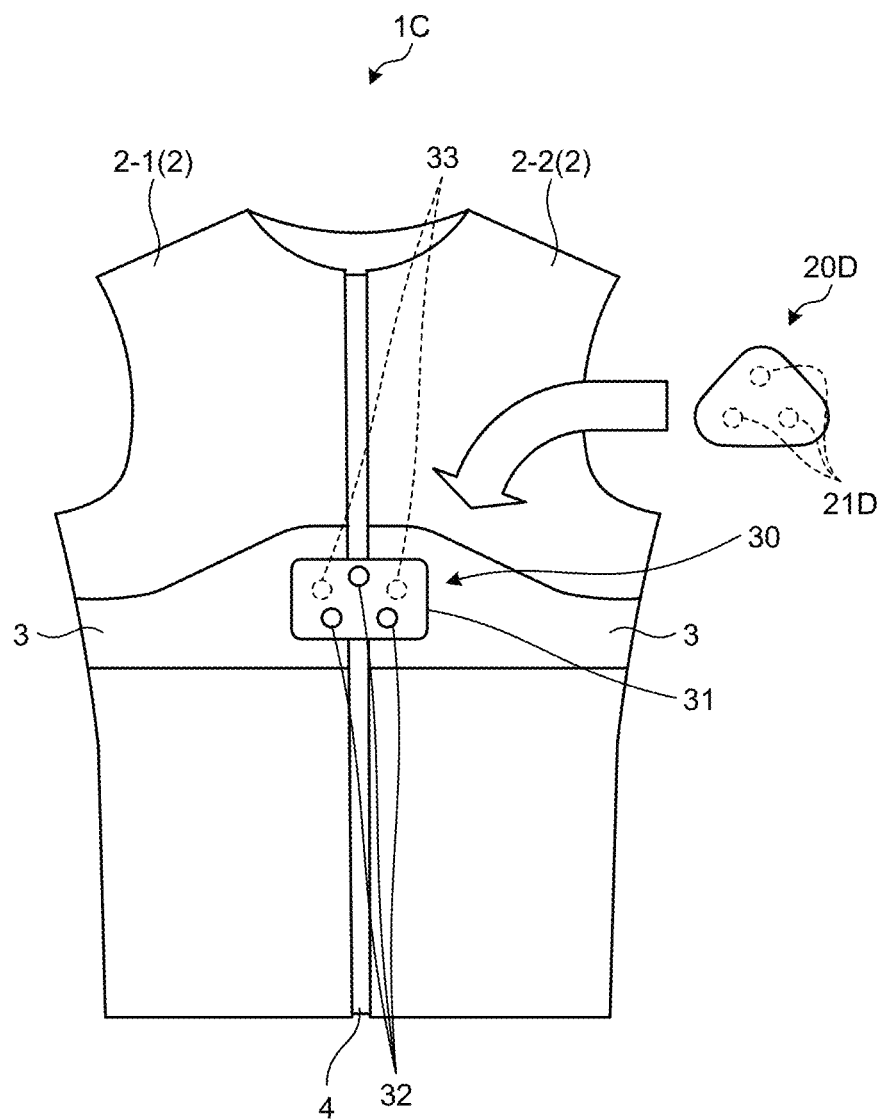
FIG. 6 is a schematic view illustrating clothing for biological signal measurement and an electronic device according to a fourth example.

FIG. 6 is a schematic view illustrating the clothing for biological signal measurement and the electronic device according to the fourth example. FIG. 6 illustrates a state where an adapter 30 is attached to the clothing for biological signal measurement 1C in FIG. 5-1.

The adapter 30 includes first connectors 32 and second connectors 33, the first connectors 32 being on a front surface of an adapter body 31 and connecting a connector 21D of an electronic device 20D, the second connectors 33 being on a back surface side of the adapter body 31 and connecting to the front material 13a of the metal connectors 13.

In the clothing for biological signal measurement 1B or 1C in which the front body can be fully opened by attaching the fastener and the like, a distance between the metal connectors 13 may be more than a certain distance due to the attachment of the fasteners and a distance between the connectors of the electronic device desired to be used is narrow. Consequently, the electronic device may not be directly attached in some configurations. In addition, when other electronic devices having different connector alignment are desired to be attached. Attaching the adapter 30 that uses the first connectors 32 corresponding to the connectors of the electronic device desired to be used to the clothing for biological signal measurement 1C allows the electronic device that cannot be directly connected to the metal connectors 13 to be attached.

The adapter 30 may be a base in which the first connectors 32, the second connectors 33, and the wirings (not illustrated) on an adapter main body 31 formed of a plastic or rubber sheet or may be a product using textiles such as woven or knitted fabrics or non-woven fabrics. In particular, an adapter in which the adapter main body 31 is constituted of the textile and is folded in two is preferable. A textile adapter having a shape in which the first connectors 32 and the second connectors 33 are arranged on the one surface of the textile, the wirings are arranged on the opposite surface, the textile is folded after the wirings are sealed with the insulating material, and the first connectors 32 and the second connectors 33 are exposed on the respective twofold surfaces is suitable for directly attaching to the clothing close to a human body because the wirings are not exposed and the touch to the human body is soft.

INDUSTRIAL APPLICABILITY

Our clothing can be applied to the technology of acquiring bioelectrical signals by wearing a clothing equipped with the electronic device.

The invention claimed is:
1. A clothing for biological signal measurement comprising:

a clothing main body part configured to be worn by a subject and comprising a skin facing surface and an outer surface opposite to the skin facing surface;

an electrode attached on the skin facing surface of the clothing main body part;

a wiring arranged on the outer surface of the clothing main body part and comprising a first end of the wiring electrically connected to the electrode and a second end of the wiring extending through a cutout part and configured to be arranged below the skin facing surface or along a hollow part of the clothing main body part;

a metal connector including a front metal element and a back metal element, electrically connected to the second end portion of the wiring by fitting the front metal element and the back metal element, the front metal connector configured to be connected to an electronic device; and an insulating layer disposed along the skin facing surface of the clothing main body part and sealing the second end portion of the wiring, the cutout part or the hollow part and the back metal element of the second metal connector.

2. The clothing for biological signal measurement according to claim 1, wherein a fabric part covering the wiring is sewn to the outer surface of the clothing main body part.

3. The clothing for biological signal measurement according to claim 1, wherein the clothing main body part is formed of a right front body and a left front body, and an openable portion between the right front body and the left front body, wherein the right front body comprises the electrode, the wiring and the metal connector, wherein the left front body comprises:

a second electrode attached to the skin facing surface;

a second wiring arranged on the outer surface of the clothing main body part and comprising a first end of the second wiring electrically connected to the second electrode and a second end of the second wiring extending through a second cutout part and configured to be arranged below the skin facing surface or along a second hollow part of the clothing main body part;

a second metal connector including a second front metal element and a second back metal element, electrically connected to the second end portion of the second wiring by fitting the second front metal element and the second back metal element, the second front metal connector configured to be connected to the electronic device; and a second insulating layer disposed along the skin facing surface of the clothing main body part and sealing the second end portion of the second wiring, the second cutout part or the second hollow part and the second back metal element of the second metal connector; and the electronic device disposed over the openable portion of the clothing main body and connected to the metal connector of the right front body and the second metal connector of the left front body.

4. The clothing for biological signal measurement according to claim 3, further comprising an adapter having a first connector and a second connector, the first connector being on a front surface side of the adapter and connecting the electronic device, the second connector being on a back surface side of the adapter and connecting to the metal connector and the second metal connector.

5. The clothing for biological signal measurement according to claim 4, wherein the adapter includes an adapter main body constituted of a textile and formed by folding the textile in two, the first connector and the second connector are arranged on one surface of the textile, an adapter wiring connecting the first connector and the second connector is arranged on an opposite side surface of the textile, and the adapter wiring is sealed with an insulating material, and the adapter main body is folded in two so that each of the first connector and the second connector is exposed on both surfaces of the adapter main body.

* * * * *